Sept. 15, 1942. F. GETTELMAN 2,296,027
BOTTLE INSPECTION ATTACHMENT FOR BOTTLE-WASHING MACHINES
Filed Feb. 12, 1940
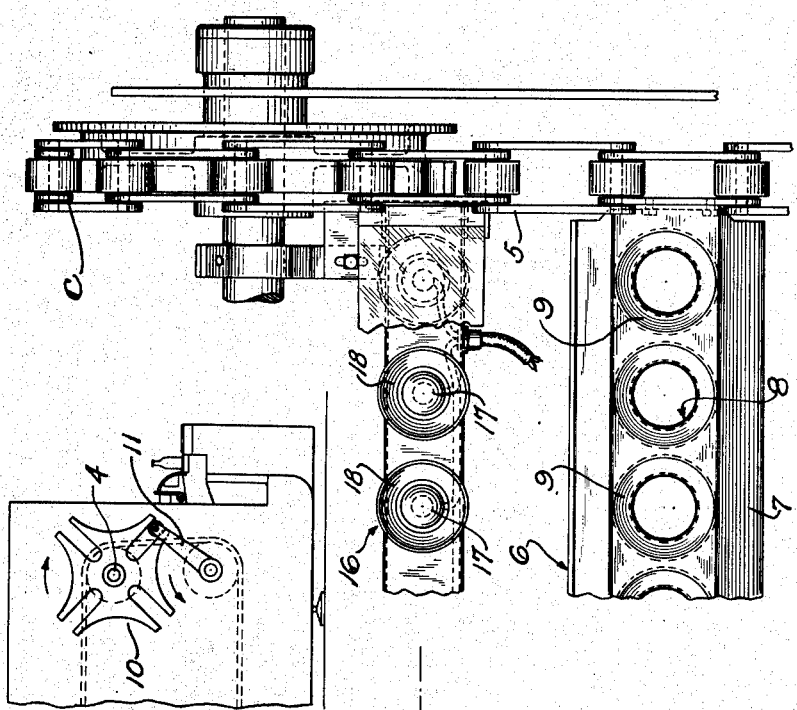
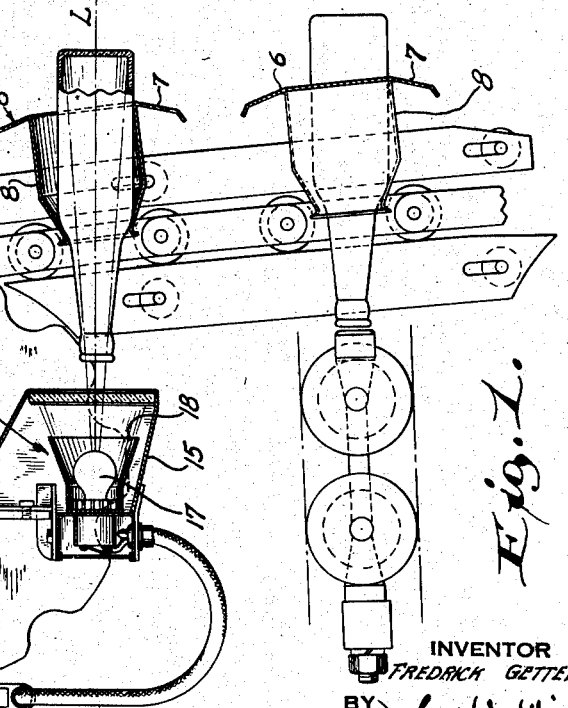
INVENTOR
FREDRICK GETTELMAN
BY John W. Michael
ATTORNEY Patented Sept. 15, 1942

2,296,027

UNITED STATES PATENT OFFICE 2,296,027

BOTTLE INSPECTION ATTACHMENT FOR BOTTLE-WASHING MACHINES

Fredrick Gettelman, Wauwatosa, Wis., assignor to Michael Yundt, Waukesha, Wis., a corporation of Wisconsin Application February 12, 1940, Serial No. 318,449

3 Claims. (Cl. 88—14)

This invention relates in general to bottle-washing machinery, and is designed particularly to facilitate inspection of the interior of the bottoms of the bottles after they have been washed and cleansed in the machine and as they are about to be delivered to the take-off conveyor thereof.

Bottle-washing machinery of the type contemplated by the present invention comprises generally a soaker or soaking tank containing a cleansing solution and through which the bottles are slowly advanced through a tortuous path by means of an endless carrier. After the bottles have passed through the soaker they are then scrubbed externally and also sprayed or brushed out internally by means of a spray of air and water, or by means of a brush of the bristle type. They are then rinsed and delivered to the take-off conveyor. In passing through the so-called washer, wherein the bottles are scrubbed internally and rinsed, the bottles are contained in bottle-holders, which usually take the form of a suitable socketed cross member mounted at its ends on endless sprocket chains. The chains are reeved about driving and idler pulleys, and the arrangement is such that at the discharge end of the washer the runs of the chains are vertical so that as the bottles pass down toward the take-off conveyors they are for a portion of their travel horizontally disposed with the bottoms of the bottles presented outwardly, and they are so disposed, as they pass the level of the eye of the attendant or attendants at the discharge end of the washer. In the washer the bottle-holders and their sprocket chains, and consequently the bottles, are not moved continuously, but are moved by step-by-step mechanism, this being necessary in order to clean the insides of the bottles.

The present invention proposes to combine with the washer of a machine of this character means for facilitating the inspection of the interiors of the bottoms of the bottles. In carrying out this purpose, the present invention provides within the washer a transversely extending box-like structure suitably carried by the frame of the machine and disposed at the level of the eye of the attendant or attendants at the discharge end of the washer and also located at the level where the bottle holders successively stop as an incident to their step-by-step motion. The box-like structure is sealed so as to be waterproof, and has the wall thereof adjacent the vertical run of the endless carrier of the washer transparent or translucent. Within the box-like structure a plurality of projectors are provided, one for each bottle-receiving socket of each bottle-holder. These projectors consist generally of a source of light, such as an ordinary electric light bulb and a reflector, so that when the bulbs are energized, beams of light are projected through the bottles in the bottle-holders alined therewith, thereby illuminating the interiors of the bottoms of the bottles while they are within convenient and full view of the attendants. Usually the bottles are found to be clean, but occasionally, where the bottles are very dirty, some particles of dirt or foreign matter will remain in or on the bottoms of the bottles, or in the corner presented at the juncture of the bottom of the bottle and the body thereof. With the present invention any such bottles may be readily detected and subjected to further cleansing operations or rejected.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a fragmentary view partly in side elevation and partly in longitudinal vertical cross section, showing a portion of a bottle washer equipped with means for facilitating the inspection of the bottoms of the bottles, in accordance with the present invention.

Figure 2 is a fragmentary view in side elevation illustrating one means which may be employed for imparting a step-by-step motion to the endless sprocket chains of the carrier of the machine; and Figure 3 is a view in end elevation looking toward the left in Figure 1.

While the present invention is applicable to various types of bottle-washing machinery, the present construction has been designed and adapted so that it may be advantageously employed with the type of bottle-washing machine disclosed in United States Letters Patent 1,729,193, granted September 24, 1929, to H. F. Stock, for Bottle cleaning apparatus, and reference is made to this patent for a disclosure of a complete machine of this character.

For present purposes it is sufficient to understand that the washer of such a machine includes an endless carrier C. The carrier C includes an endless sprocket chain 5 at each side of the machine, only one of the sprocket chains being shown in the drawing since they are of identical construction. At regularly spaced points along these sprocket chains the bottle holders or carriers, designated generally at 6, are provided. Each bottle holder 6 comprises a cross plate 7 of sheet metal extending transversely between the sprocket chains 5 and having its ends connected thereto and supported thereby. A row of bottle-receiving receptacles 8 is carried by each cross plate and consists simply of an open-ended metal shell, one end of which is welded, soldered, or otherwise suitably secured to the cross plate and surrounds an opening 9 provided in the cross plate. The inner end of each shell-like bottle receptacle 8 is contracted—that is, is of gradually reduced cross sectional area so as to be engageable with and support a tapered portion of the neck of the bottle.

The driving mechanism for imparting a step-by-step or intermittent motion to the endless carrier C is illustrated in complete detail in said United States Letters Patent 1,729,193, and for present purposes it is sufficient to understand that, in the driving gear which interconnects the source of power or motor with one of the shafts 4, there is interposed a four slotted gear 10 which is driven by a one-toothed driving gear 11, as illustrated in Figure 2.

With this construction when the machine is in operation the intermittent motion of the endless carrier brings the bottle-holders successively to a stop or standstill at the level L in Figure 1, which level is located at the level of the eye of the attendant or attendants at the discharge end of the washer. Also located at this level, but inwardly of the path of travel of the vertical run of the endless carrier, I provide a horizontally disposed transversely extending box or receptacle 15. The box or receptacle 15 may be constructed principally of sheet metal, hermetically sealed against the ingress of moisture by the provision of suitable packing, or in any other appropriate way, and has the wall thereof adjacent the vertical run of the carrier constituted of glass or other diaphanous material, that is, material which has the property of appropriately transmitting light, and which may be either transparent or translucent. Within the receptacle 15 I provide a row of projectors, designated generally at 16. There is one such projector for each bottle receptacle, and they are individually alined with the bottle-receiving receptacles of the endless carrier. Each projector includes a light bulb or source of light 17 and a reflector 18. The projectors are so interrelated with the machine that when the bottle-holders come to a stop at the level L, beams of light from the projectors will pass directly through the individual bottles, thereby illuminating the interiors of the bottles and the bottoms thereof and greatly facilitating the inspection of the bottoms of the bottles and especially the interior of the bottoms of the bottles and the corner at the juncture of each bottle bottom and its body portion.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. In combination with a bottle-washing machine having a bottle carrier advanced with a step-by-step motion and equipped with a series of bottle holders spaced longitudinally of the carrier, each holder having a series of spaced apertures in each of which a bottle is received with its mouth exposed, an individual light source for each aperture of a bottle holder, a reflector optically associated with each light source and positioned to project a beam of light through the mouth of the bottle lengthwise thereof as it is advanced to the take-off conveyor, and a waterproof protective casing and support for said light sources and reflectors supported in the bottle washer and having a diaphanous wall through which said beams of light are projected.

2. The combination with a bottle washing machine having a bottle carrier advanced with a step-by-step motion and provided with individual bottle holders of open-end construction, said bottle carrier progressing vertically at the delivery end of the washer to a take-off means, the bottles being horizontally disposed in their bottle holders with their mouth exposed toward the interior of the washer as the carrier moves vertically toward the take-off end of the washer, of means disposed within the washer and comprising a light projector, means supporting the light projector in horizontal alinement with the mouth and neck of the bottle as it comes to a temporary standstill and is horizontally disposed at the delivery end of the washer whereby said projector projects a beam of light lengthwise through the mouth of the alined bottle to illuminate the interior of the bottom of the bottle so that it may be viewed from the exterior of the delivery end of the washer, and a water-proof casing for said projector including a diaphanous wall through which said beam is projected.

3. The combination with a bottle-washing machine having a bottle carrier advanced with a step-by-step motion and provided with individual bottle holders of open-end construction in which the bottle is received with its mouth exposed, of means comprising a light projector positioned to project a beam of light through the mouth of the bottle substantially parallel with its central longitudinal axis as it comes to a temporary standstill.

FREDRICK GETTELMAN.